United States Patent
Fujii et al.

(10) Patent No.: US 8,571,573 B2
(45) Date of Patent: Oct. 29, 2013

(54) RADIO COMMUNICATION APPARATUS AND RADIO COMMUNICATION METHOD IN COMMUNICATION SYSTEM

(75) Inventors: Hiromasa Fujii, Yokosuka (JP); Hitoshi Yoshino, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 305 days.

(21) Appl. No.: 12/934,080

(22) PCT Filed: Mar. 17, 2009

(86) PCT No.: PCT/JP2009/055193
§ 371 (c)(1),
(2), (4) Date: Nov. 11, 2010

(87) PCT Pub. No.: WO2009/122901
PCT Pub. Date: Oct. 8, 2009

(65) Prior Publication Data
US 2011/0059701 A1 Mar. 10, 2011

(30) Foreign Application Priority Data

Apr. 2, 2008 (JP) ................................. 2008-096357

(51) Int. Cl.
*H04W 24/00* (2009.01)
(52) U.S. Cl.
USPC ....................................... 455/456.1; 455/63.1
(58) Field of Classification Search
USPC ................. 455/452.2, 454, 456.1, 63.1, 63.4, 455/67.13, 501, 524
See application file for complete search history.

(56) References Cited

U.S. PATENT DOCUMENTS

2008/0075059 A1* 3/2008 Kermoal et al. ............... 370/343
2009/0117914 A1* 5/2009 Kwon et al. .................. 455/454

FOREIGN PATENT DOCUMENTS

| JP | 2007-214819 A | 8/2007 |
| JP | 2008-061249 A | 3/2008 |
| JP | 2008-072646 A | 3/2008 |

OTHER PUBLICATIONS

Perez-Romero, et al., "A Novel On-Demand Cognitive Pilot Channel enabling Dynamic Spectrum Allocation," New Frontiers in Dynamic Spectrum Access Networks, 2007. DySPAN 2007. 2nd IEEE International Symposium, Apr. 2007, pp. 46 to 54, 9 pages.
Patent Abstracts of Japan, Publication No. 2008-061249, dated Mar. 13, 2008, 1 page.
P. Martigne, S. Ben Jemaa, et al., "An alternative concept to scanning process for cognitive radio systems: technical and regulatory issues," 16th IST Mobile and Wireless Communications Summit, 2007, pp. 1-5, Jul. 2007, 5 pages.
International Search Report issued in PCT/JP2009/055193, mailed on Jun. 2, 2009, with translation, 7 pages.
Written Opinion issued in PCT/JP2009/055193, mailed on Jun. 2, 2009, 3 pages.
Japanese Office Action for Application No. 2008-096357, mailed on Sep. 11, 2012 (4 pages).
Patent Abstracts of Japan for Japanese Publication No. 2007-214819, publication date Aug. 23, 2007 (1 page).
Patent Abstracts of Japan for Japanese Publication No. 2008-072646, publication date Mar. 27, 2008 (1 page).

* cited by examiner

*Primary Examiner* — Ping Hsieh
(74) *Attorney, Agent, or Firm* — Osha Liang LLP

(57) ABSTRACT

A radio communication apparatus includes: a receiving unit configured to receive a cognitive signal including system information of each of a plurality of systems; a metric unit configured to prepare metric information indicating relationship degree between the radio communication apparatus and a communication system to which the radio communication apparatus does not belong; a condition determination unit configured to determine whether a restriction should be imposed on transmission by the radio communication apparatus based on the system information and the metric information; and a transmission unit configured to transmit a signal using predetermined radio resources when transmission by the radio communication apparatus is not prohibited.

6 Claims, 12 Drawing Sheets

FIG.10

| RECEPTION LEVEL | PERMITTED TRANSMISSION POWER |
|---|---|
| > −140dBm/Hz | TRANSMISSION PROHIBITED |
| > −150dBm | > −70dBm/Hz |
| > −160dBm | > −60dBm/Hz |
| > −180dBm | > −40dBm/Hz |

RADIO COMMUNICATION APPARATUS AND RADIO COMMUNICATION METHOD IN COMMUNICATION SYSTEM

TECHNICAL FIELD

The present invention relates to a technical field of mobile communications. More particularly, the present invention relates to a radio communication apparatus and a radio communication method used in an area where a plurality of communication systems coexist.

BACKGROUND ART

Conventionally, frequencies are exclusively assigned to systems and carriers in a fixed manner according to specific respective purposes. However, in recent years, as the bands of new systems widen, as the new radio interfaces are becoming sophisticated, and as the standardized speed increases, frequency resources are drying up. It is becoming difficult to assign a new frequency to a new system exclusively in a fixed manner as in the past.

Regarding this problem, in the technique shown in the non-patent document 1, a method is proposed for using software radio and cognitive support pilot channel (CPC: cognition supporting pilot channel).

[Non-patent document 1] "An alternative concept to scanning process for cognitive radio systems: technical and regulatory issues", Martigne, P.; Moessner, K.; Cordier, P.; Ben Jemaa, S.; Houze, P.; Agusti, R.; Deschamps, B.; Bender, P.; Jeanty, L.; Bourse, D.; 16th IST Mobile and Wireless Communications Summit, 2007. 1-5 Jul. 2007, pp. 1-5

DISCLOSURE OF THE INVENTION

Problem to be Solved by the Invention

In the method described in the non-patent document 1, for example, the universal pilot channel (CPC) is prepared and broadcasted. The terminal periodically monitors the CPC when and even after the power is turned on. CPC includes, for example, information on system information (frequency assignment status, area, operator, radio interface specification) and the like of each of a plurality of systems. The terminal reconstructs a configuration of the terminal and performs transmission using a specified frequency band based on the information.

FIG. 1 shows an outline of the system when using CPC. In the example shown in the figure, two systems coexist in a same area, and operators 1 and 2 provide services respectively. Terminals of both systems receive CPC.

FIG. 2 shows a block diagram of a transceiver used in FIG. 1. Although the transceiver is typically provided in a mobile station (user apparatus, more generally), it may be provided in a base station. A data signal generated by a data signal generation unit 21 and a control signal generated by a control signal generation unit 22 are input into a multiplexing unit 24, and are properly mapped to resources specified by a resource control unit 23 respectively. A multiplexed signal is transmitted by radio via a radio circuit unit 25. A received signal is supplied to a demultiplexing unit 26 via the radio circuit part 25, and is demultiplexed to various signals (control signal, data signal and CPC, in the example shown in the figure). The control signal is analyzed by a control signal receiving unit 27, so as to prepare, for a data receiving unit 28, control information accompanying a downlink data signal such as resource information assigned to the downlink data signal and transmission format information. According to the control information, the data receiving unit 28 restores the downlink data signal. Control information (resource information, transmission format information and the like) in the case when radio resources are assigned to the uplink is supplied to processing units in the transmission side (particularly to the resource control unit 23).

The CPC detection unit 29 detects and extracts system information included in CPC, and supplies the system information to a shared control unit 30. On the other hand, the current position of this transceiver is specified by a position information recognizing unit 31. For example, the position detection may be performed by using a receiver for global positioning system (GPS). As mentioned above, the received CPC includes system information (frequency assignment information, area, operator, radio interface specification, and the like) of a plurality of radio communication systems. The transceiver selects information corresponding to the current area of the transceiver from the system information indicating a plurality of pieces of frequency assignment information. In addition to the plurality of pieces of frequency assignment information, the selected information includes use purposes (mobile communication system, radar, WLAN and the like), and information indicating usable carrier and the like for each of the plurality of frequency bands. The transceiver selects usable frequency information and starts communication using the selected frequency band.

In the method using CPC, there is fear that operation of both or at least one of radio communication systems becomes difficult at the boundary of areas (systems) where frequency assignments are different due to the effect of inter-system interference.

One of causes of occurrence of such interference is that carriers assigned by CPC are different and independent. In a mobile communication system, for designing cells, frequency arrangement, base station arrangement and the like are determined in consideration of the inter-cell interference and the like. However, it is difficult to predict accurately interference received from other system in cell design. Therefore, in the case when receiving interference from a different carrier (other system), expected performance cannot be fully exhibited in each cell, so that a problem may occur in operation of the system.

The second cause of occurrence of inter-system interference is that types of link (uplink/downlink) assigned by CPC are different.

FIG. 3 shows a diagram for explaining a manner in which interference occurs. For example, it is assumed that frequency assignment situations of adjacent areas A and B are cases 1 and 2 respectively, and that a frequency division duplex (FDD) scheme is used in each area. In this case, inter-system interference is stronger in the frequency used for different types of uplink and downlink in cases 1 and 2 respectively compared to the frequency used for the same type of uplink/downlink in both of cases 1 and 2. In other words, inter-system interference becomes larger in the case when FDD uplink and downlink are used in adjacent areas, compared to the case between FDD downlinks or between FDD uplinks. There are following two reasons for that.

First, as to interference from other base station C in the uplink communication (A-A), the base station C becomes the interference source (refer to FIG. 4). In this case, transmission power and antenna gain are large compared to the case when the interference source is a mobile station, and in this case, visibility easily appears. Due to these effects of propagation environment, there is fear that the effect of interference between bands becomes large.

On the other hand, as to interference from other mobile station in the downlink, the interference source is the mobile station, and transmission power and antenna gain are smaller than those of the base station. However, there is a possibility that mobile stations come very close to each other. In such a case, there is fear that effect of interference between bands becomes large (refer to FIG. 5).

An object of the present invention is at least to reduce inter-system interference in an area where a plurality of communication systems coexist.

Means for Solving the Problem

According to an embodiment of the present invention, a radio communication apparatus for use in an area where a plurality of communication systems coexist is used. The apparatus includes:

a receiving unit configured to receive a cognitive signal including system information of each of the systems;

a metric unit configured to prepare metric information indicating relationship degree between the radio communication apparatus and a communication system to which the radio communication apparatus does not belong;

a condition determination unit configured to determine whether a restriction should be imposed on transmission by the radio communication apparatus based on the system information and the metric information; and a transmission unit configured to transmit a signal using predetermined radio resources when transmission by the radio communication apparatus is not prohibited.

EFFECT OF THE INVENTION

According to the present invention, it becomes possible at least to reduce inter-system interference in an area where a plurality of communication systems coexist.

BRIEF DESCRIPTION OF THE DRAWINGS

FIG. 10 is a diagram showing an example of correspondence relationship between the reception level and the transmission power;

Figure 1:
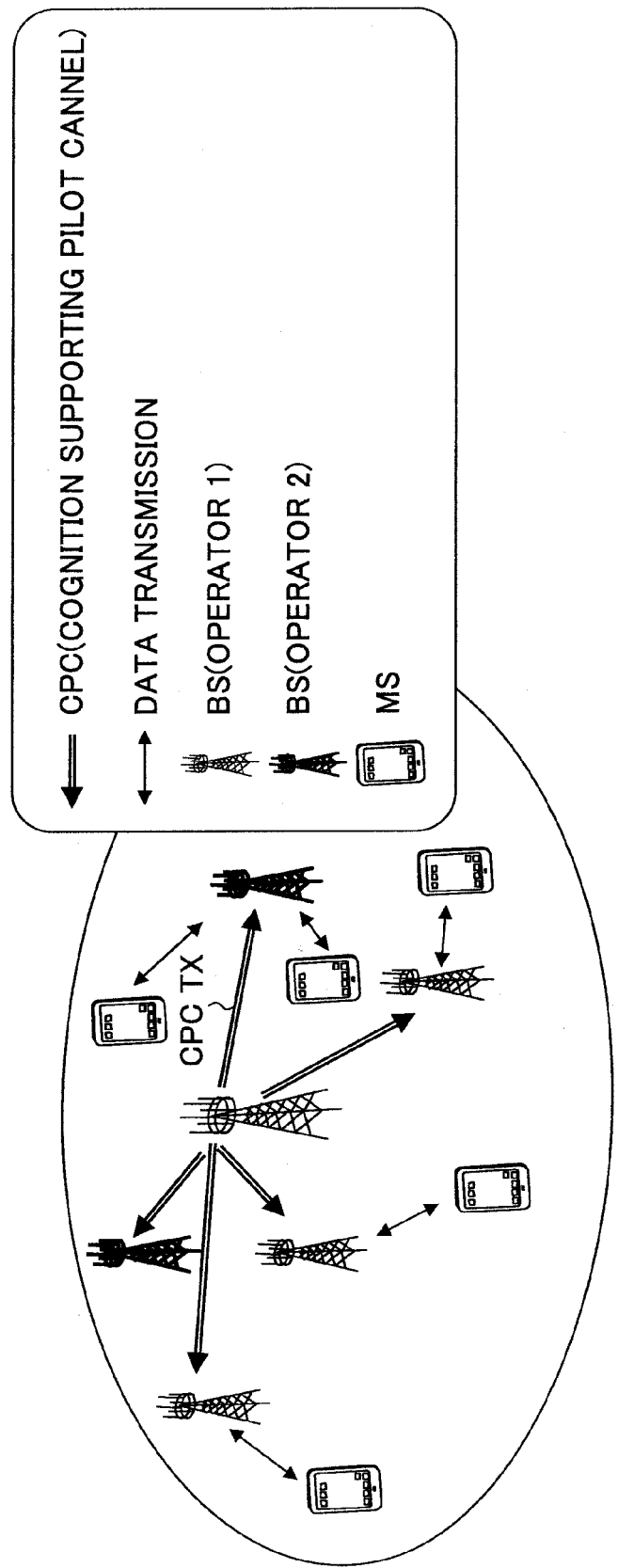
FIG. 1 is a diagram showing an outline of a system in the case when using CPC.
Figure 2:
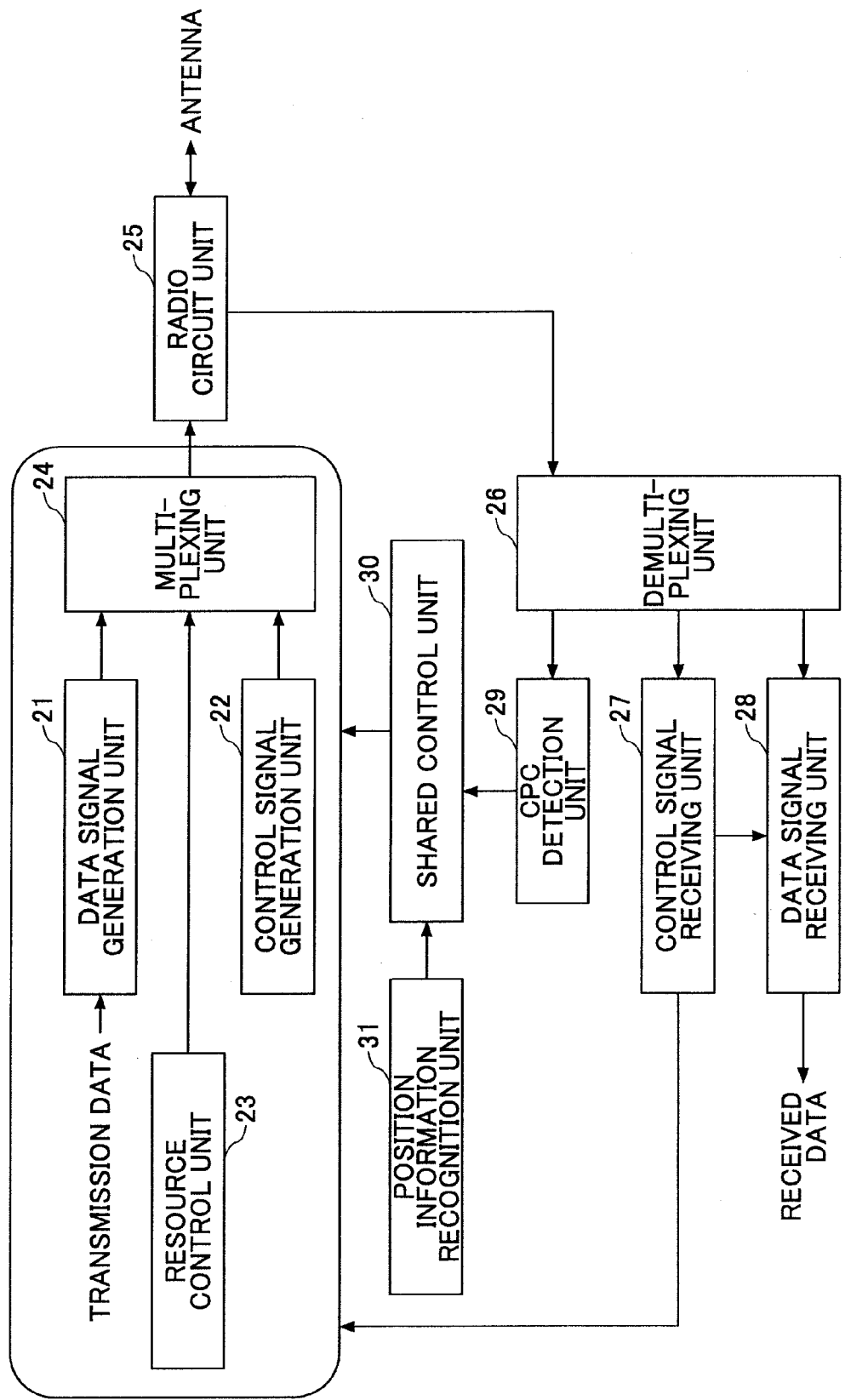
FIG. 2 shows a block diagram of a transceiver used in FIG. 1.

DESCRIPTION OF REFERENCE SIGNS 21 data signal generation unit
22 control signal generation unit
23 resource control unit
24 multiplexing unit
25 radio circuit unit
26 demultiplexing unit
27 control signal receiving unit
28 data signal receiving unit
29 CPC detection unit
30 shared control unit
31 position information recognition unit
32 area end distance calculation unit
35 adjacent area signal receiving unit
41 existence notification signal transmission unit
42 existence notification signal receiving unit

PREFERRED EMBODIMENTS FOR CARRYING OUT THE INVENTION

According to an embodiment of the present invention, by determining transmission permission/rejection or by controlling the upper limit of transmission power according to the distance to each area end where frequency assignment is different, interference at the area boundary is controlled so as not to be excessively large.

In addition, from the viewpoint of utilizing frequencies more efficiently, if the transceiver is not actually operating in an adjacent area, transmission of a signal is permitted even though the distance to each area where frequency assignment is different is short. The reason is that, even though such transmission is permitted, there is no transceiver that receives interference in the adjacent area.

[Embodiment 1]

Figure 6:
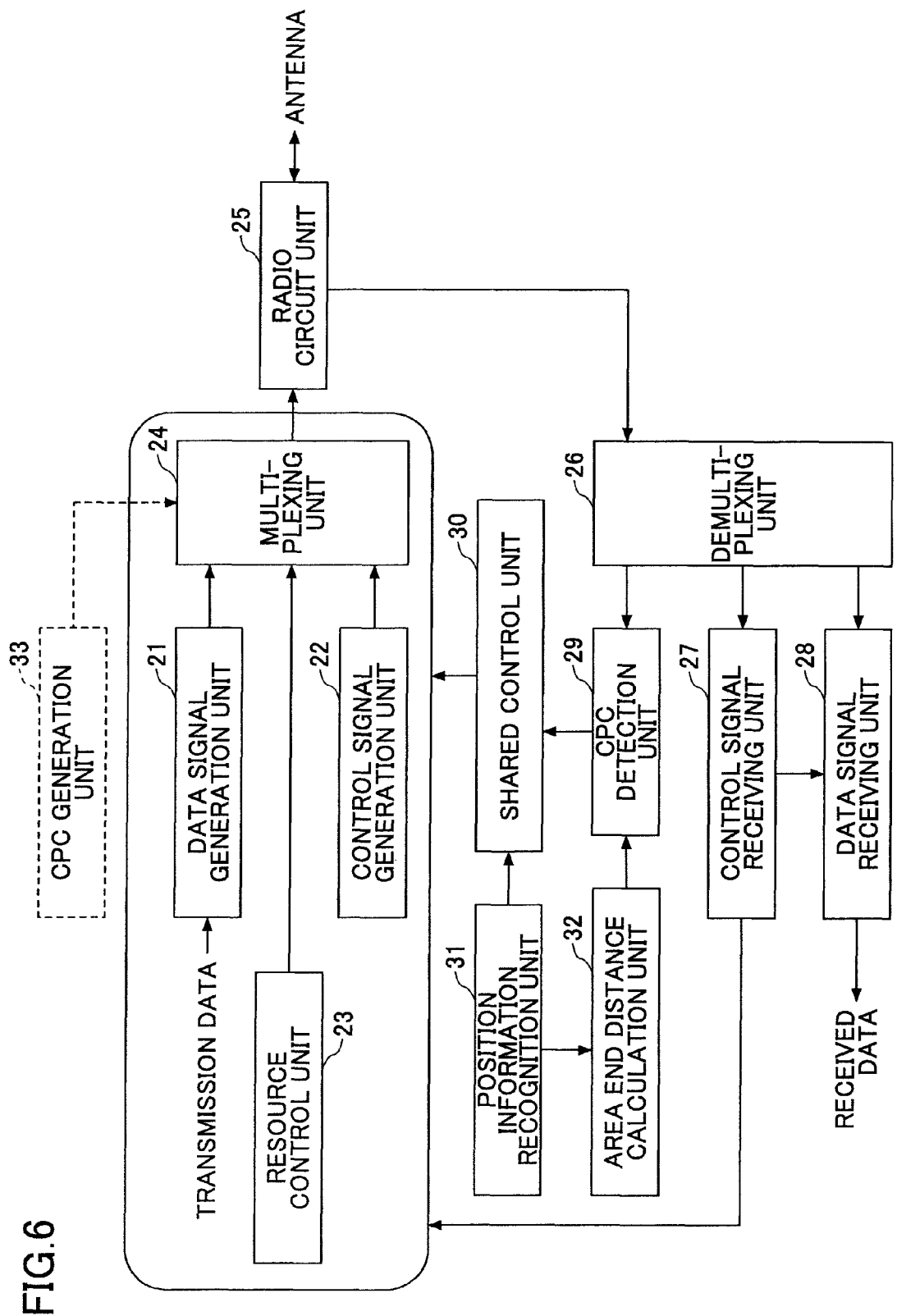
FIG. 6 is a diagram showing a transceiver in an embodiment of the present invention.

FIG. 6 shows a transceiver in an embodiment of the present invention. For the sake of convenience of explanation, although it is assumed that the transceiver is provided in the user apparatus, the transceiver may be provided in the base station. FIG. 6 shows a data signal generation unit 21, a control signal generation unit 22, a resource control unit 23, a multiplexing unit 24, a radio circuit unit 25, a demultiplexing unit 26, a control signal receiving unit 27, a data signal receiving unit 28, a CPC detection unit 29, a shared control unit 30, a position information recognition unit 31 and an area end distance calculation unit 32.

The data signal generation unit 21 prepares transmission data such as user traffic data and the like. Channel coding, data modulation, interleaving and the like are properly performed on the transmission data.

The control signal generation unit 22 prepares a control signal including control information that accompanies a data signal and/or control information that does not accompany a data signal. Also, for the control signal, channel coding, data modulation, interleaving and the like are properly performed.

The resource control unit 23 reports assignment information of resources usable for communication to the multiplexing unit 24 as necessary.

The multiplexing unit 24 generates a signal including a control signal and a data signal. Although not shown in the figure, another signal such as a pilot signal may be multiplexed as necessary.

The radio circuit unit 25 performs processing for signal conversion between baseband signal and radio signal in preparation for transmitting and receiving. The processing may include digital analog conversion, frequency conversion, band limitation, power amplification and the like. In the case when the orthogonal frequency division multiple access (OFDMA) scheme is used, inverse Fourier transform is performed on the multiplexed signal (Fourier transform is performed on the received signal). In the case of the single-carrier frequency division multiple access (FDMA) scheme, discrete Fourier transform, signal mapping and inverse fast Fourier transform may be performed in baseband.

The demultiplexing unit 26 demultiplexes the received signal into various signals.

The control signal receiving unit 27 receives, demodulates and decodes the control signal so as to extract control information. Based on the control information, the transceiver can be prepared to receive a downlink data signal, or can be prepared to transmit an uplink data signal.

The data signal receiving unit 28 demodulates and decodes the received data signal to restore the data signal according to the control information.

The CPC detection unit 29 extracts each piece of system information from CPC and analyzes it. When a plurality of systems coexist, the system information includes system information of each system. Each piece of system information may include frequency band (system band), operator, service area, radio access scheme specification and the like.

The shared control unit 30 adjusts the transceiver in accordance with a system specification to which the transceiver belongs based on CPC.

The position information recognition unit 31 calculates or prepares the current position of the transceiver. The current position may be obtained from a signal received by a GPS receiver, or may be derived based on any other mensuration.

Figure 3:
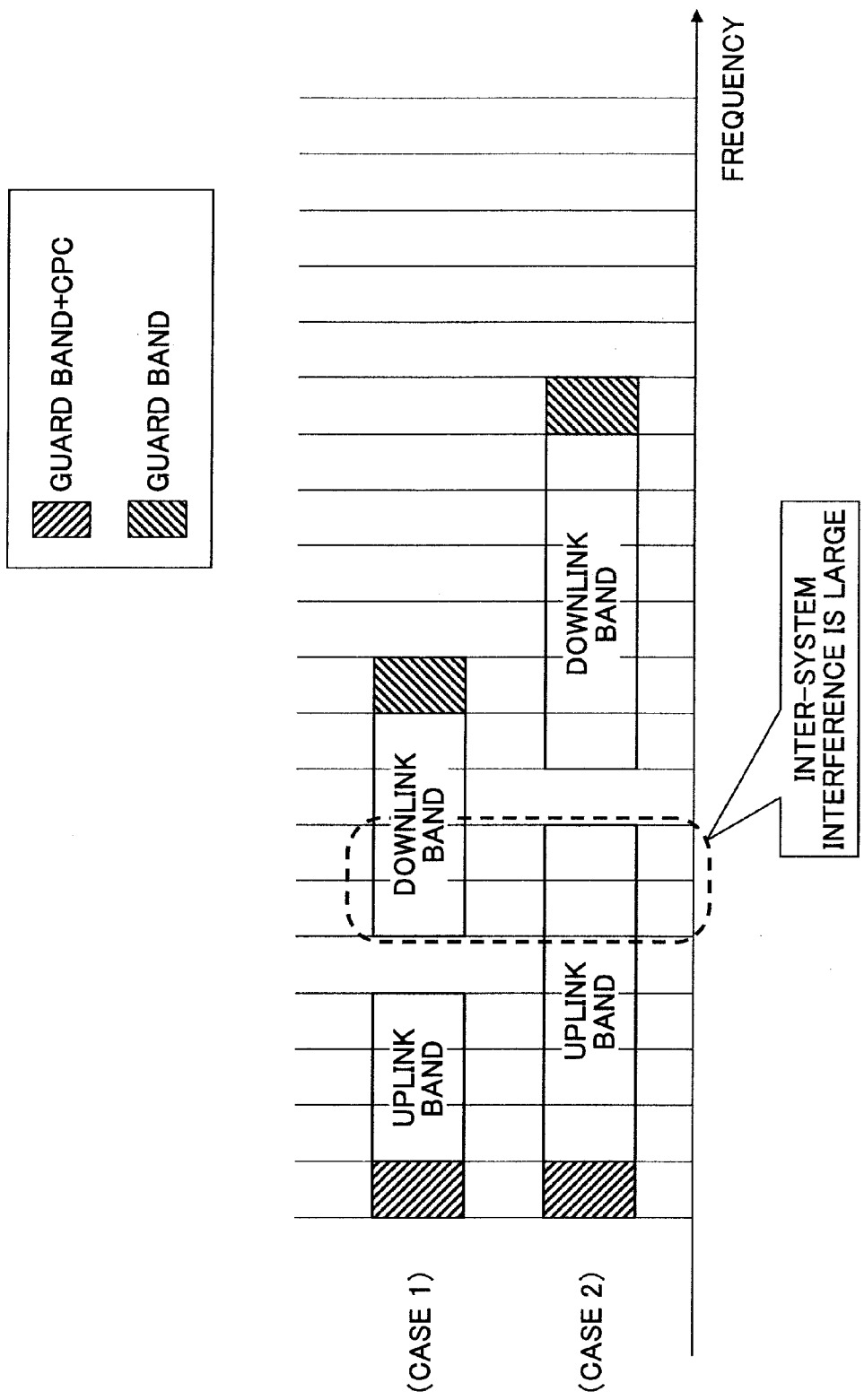
FIG. 3 shows a diagram for explaining a manner where interference occurs.
Figure 4:
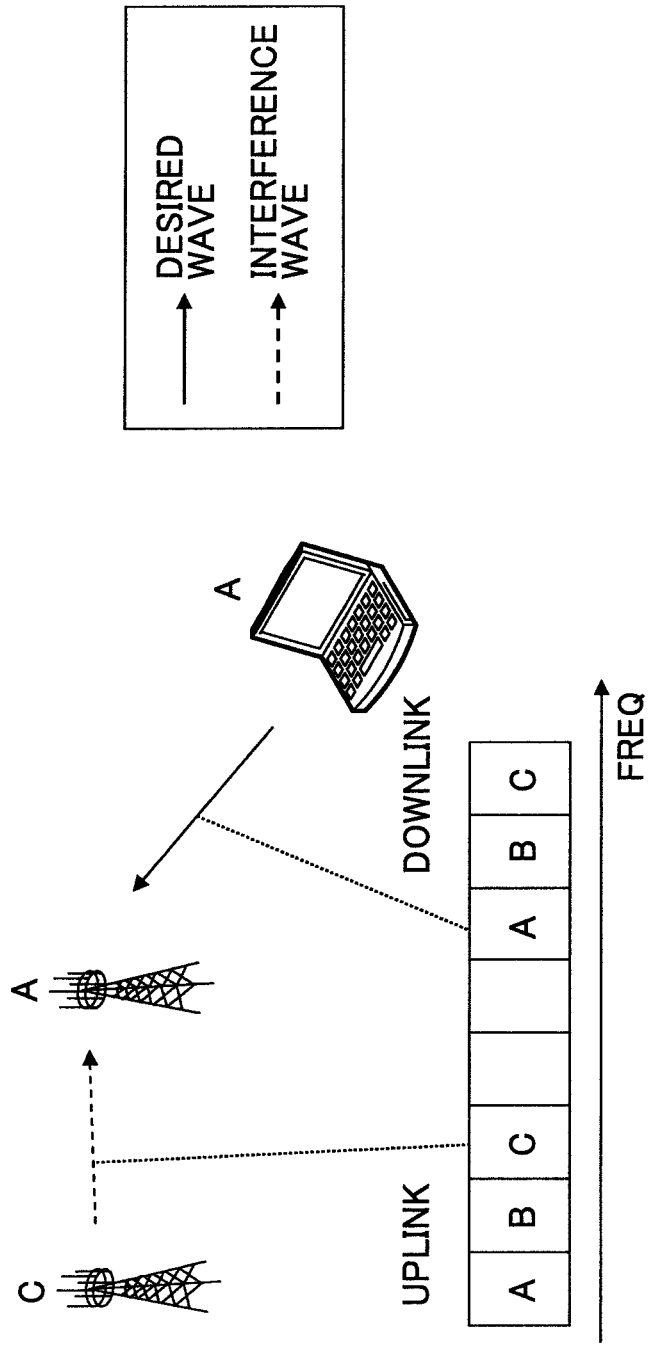
FIG. 4 is a diagram showing a manner in the case when the interference source is a base station.
Figure 5:
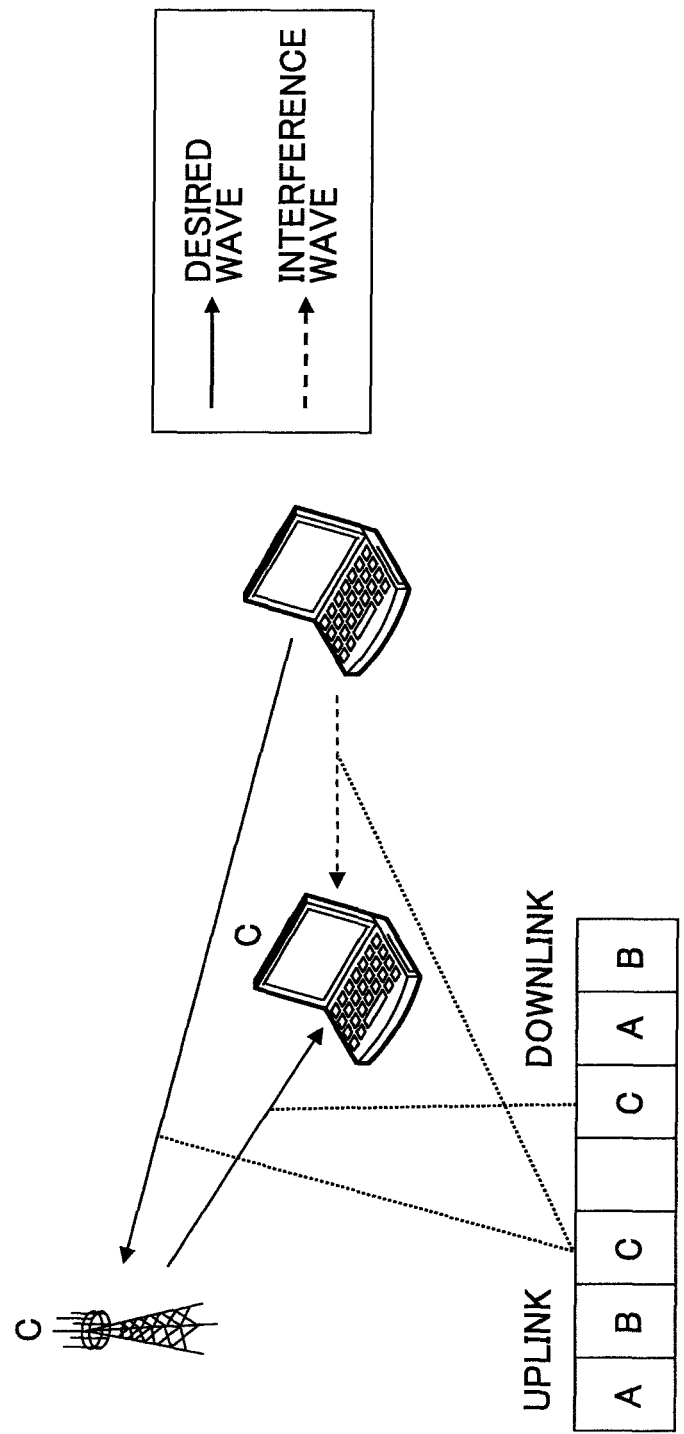
FIG. 5 is a diagram showing a manner in the case when the interference source is a base station.

The area end distance calculation unit 32 obtains the shortest distance between the transceiver and a system boundary based on the system information and the current position of the transceiver. The system boundary in this case is a boundary between the own system and other system, and the other system is an adjacent system adopting a frequency assignment scheme different from that of the own system. For example, when the frequency assignment scheme of the own system is as the case 1 of FIG. 3, an adjacent system using a frequency assignment scheme like case 2 corresponds to the other system.

Although, the transceiver is provided in the user apparatus for the sake of simplicity of explanation, the transceiver may be provided in the base station as mentioned above. In the case when the transceiver shown in the figure is provided in the base station, the resource control unit 23 includes, in addition to the above-mentioned function, a function of a scheduler for making an assignment schedule of unlink/downlink radio resources. In addition, as shown using a dashed line frame, a CPC generation unit 33 is provided so as to prepare CPC including system information of each of the radio systems where services are provided near the area to which the transceiver (base station) belongs. The prepared CPC is multiplexed to a downlink signal by the multiplexing unit 24, and is transmitted via the radio circuit unit 25.

(Operation Example for Prohibiting Transmission)

In the transceiver of the present invention, the shortest distance between the current position of the transceiver and a boundary with the other system (an area where frequency assignment recognized by CPC is different) is calculated. The area where frequency assignment is different indicates an area where assignment of frequency which the transceiver is about to transmit/receive is different, not for all frequencies. More particularly, the frequency indicated as "inter-system interference is large" in FIG. 3 corresponds to the frequency. By the way, "frequency assignment is different" may mean that the frequency band is different, may mean that the assigning carrier is different, may mean that the uplink/downlink type is different, or may mean that air interface is different. Also, it may be defined as a combination of these.

When the calculated shortest distance is equal to or greater than a predetermined distance, it is permitted to perform transmission using the band as scheduled (can perform communication according to the scheduling of the base station). However, when the calculated shortest distance is less than the predetermined distance, transmission using the band is prohibited. Even though radio resources have been assigned from the base station, transmission is prohibited due to the fact that the shortest distance is short. The predetermined distance may be a value that is fixedly set, or may be a value transmitted by CPC for each area (or boundary of each area).

(Operation Example for Restricting Transmission Power)

In the above-mentioned method, the shortest distance to an area where frequency assignment is different is calculated, and when the distance is equal to or less than a predetermined value, it is totally prohibited to use a specific band. This method is preferable from the viewpoint of suppressing inter-system interference with reliability, but the method is not necessarily preferable from the viewpoint of frequency use efficiency.

In view of these, it can be considered to permit transmission if the transmission power is weak even though the shortest distance is equal to or less than the threshold value. The reason is that, if the transmission power is weak, interference exerted on other system becomes small. Intensity of transmission power may be variously changed not only according to whether the shortest distance exceeds the threshold value but also according to distances.

Figure 7:
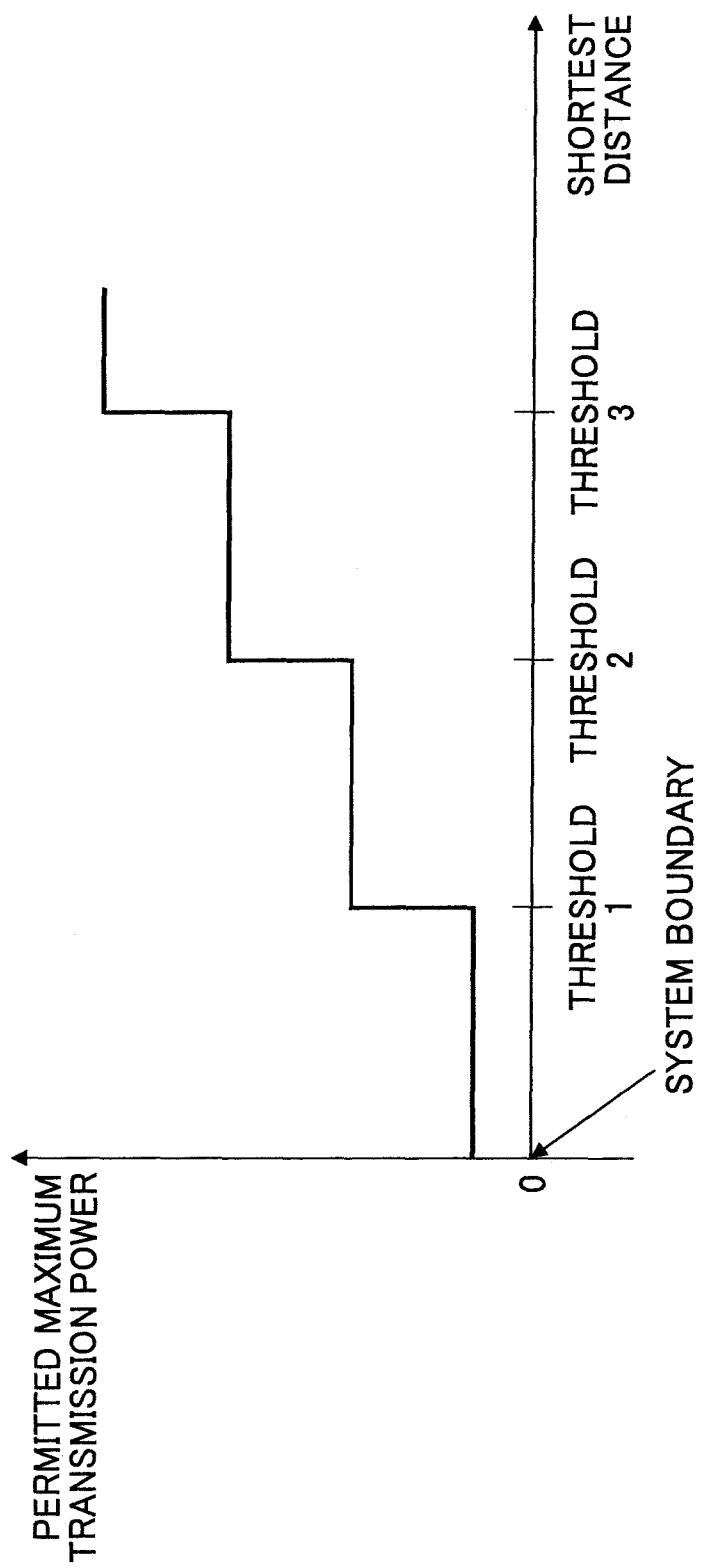
FIG. 7 is a diagram showing a manner in which the permitted maximum transmission power is controlled according to the distance.

FIG. 7 shows an example in which the permitted maximum transmission power is set such that it gradually changes according to the measured shortest distance. More particularly, in the same way as the case mentioned above, the shortest distance to the area where frequency assignment is different is calculated. Then, the permitted maximum transmission power value is derived according to the distance. Power control may be performed not only in a stepwise manner as shown in the figure but also in a continuous manner according to the distance. The correspondence relationship between the distance and the transmission power shown in FIG. 7 may be stored in the transceiver beforehand as a list table for example. Transmission power to be applied may be determined by referring to the stored value. In addition, the restricted transmission power may be broadcasted using a common control channel and the like.

[Embodiment 2]

(Operation Example for Using an Interference Level Received from an Adjacent Area)

In the above-mentioned embodiment, transmission permission/rejection or transmission power restriction is performed according to the distance to the area where frequency assignment is different. This method assumes that length of the distance to the system boundary corresponds to strength of interference exerted on other system. However, even though the distance is short, if communication is not performed near the boundary of the adjacent other system, it is not necessary to restrict transmission from the transceiver of the own system. This is because there is no actual damage even if transmission is performed from the transceiver.

Figure 8:
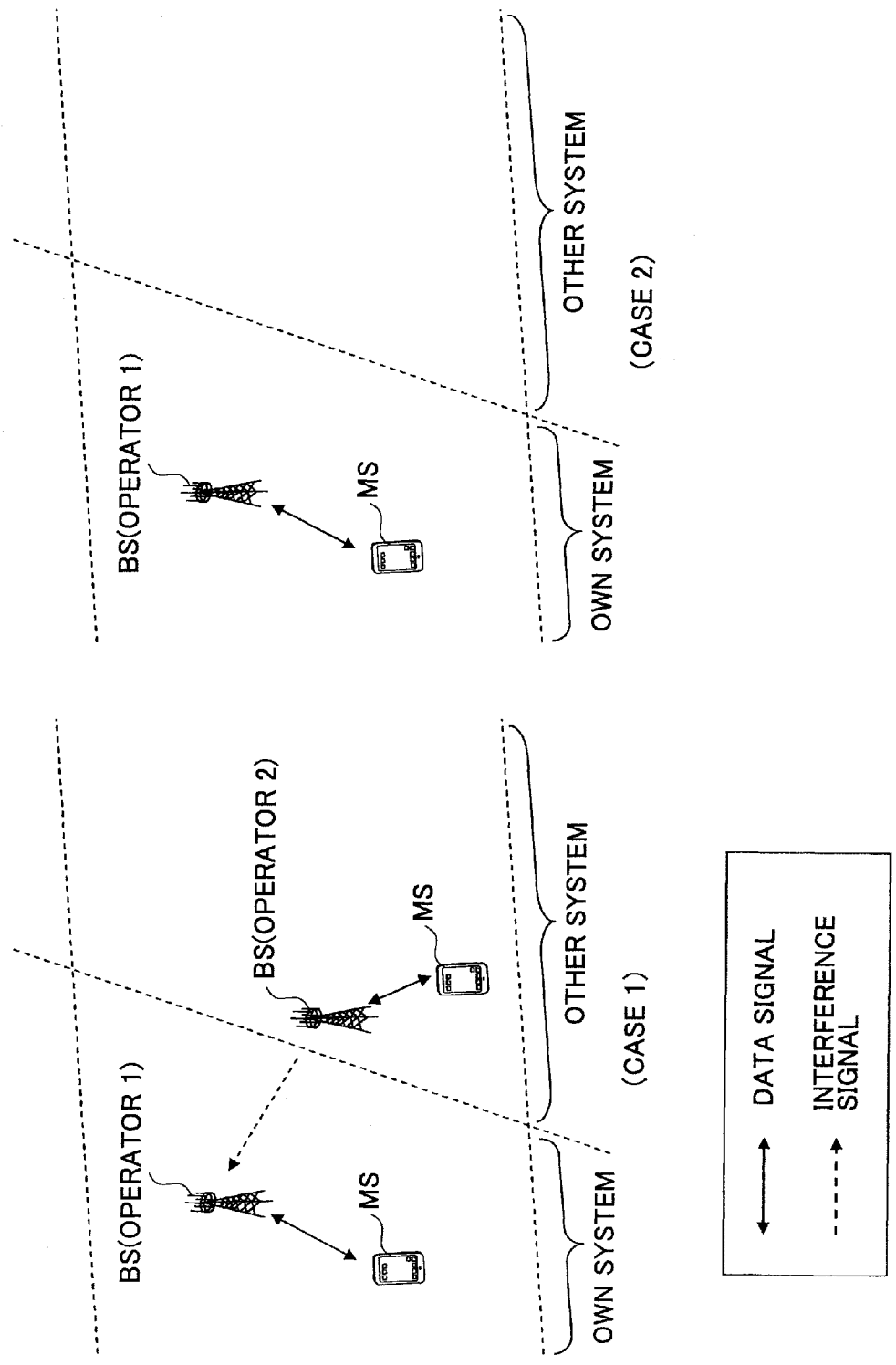
FIG. 8 is a diagram for explaining that interference level from other system should be considered.

As shown in the left side (case 1) of FIG. 8, for example, when communication is being performed near the system boundary in both of the own system and the other system, the systems exerts interference on each other. However, as shown in the right side (case 2) of FIG. 8, when communication of the other system is not performed near the system boundary, it is supposed that interference barely occurs near the system boundary.

In the present invention, if the distance to the area where different frequency assignment is performed is less than the predetermined value, permission/rejection of transmission is determined in consideration of interference level from the other system.

Figure 9:
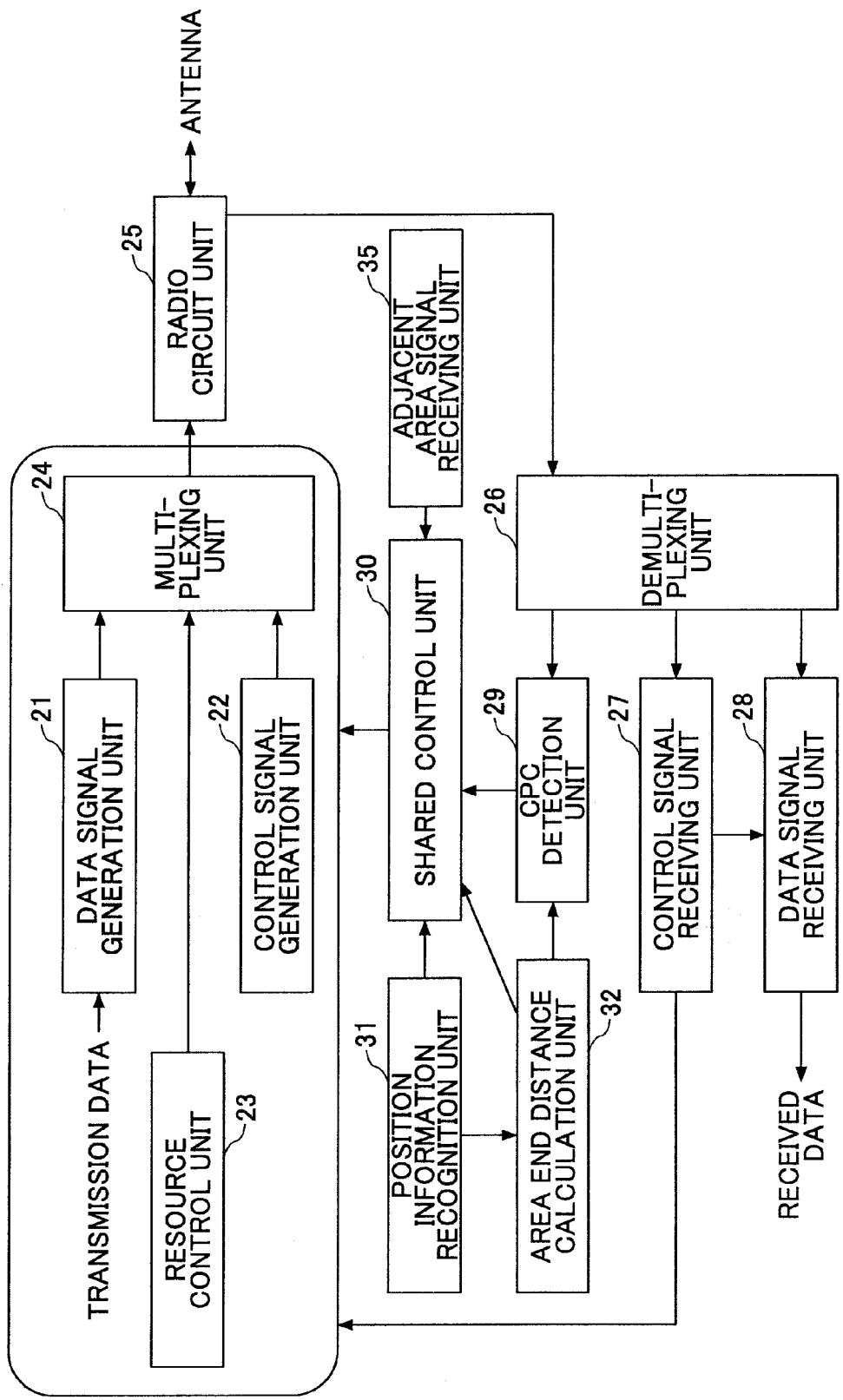
FIG. 9 is a diagram showing a transceiver in an embodiment of the present invention.

FIG. 9 shows a transceiver of an embodiment of the present invention. The same reference numbers are assigned to components already described in FIG. 6, and repeated explanation is not given. In FIG. 9, an adjacent area signal receiving unit 35 is further shown. The adjacent area signal receiving unit 35 receives a signal of the system of the different frequency assignment, and determines reception level (that is, received interference signal level). The shared control unit 30 determines permission/rejection of transmission or contents of transmission power control based on the reception level and the distance supplied from the area end distance calculation unit 32. When performing transmission power control, correspondence relationship between reception level and transmission power may be prepared instead or in addition to the correspondence relationship between distance and transmission power.

FIG. 10 shows an example of the correspondence relationship between the reception level and the transmission power.

According to the present embodiment, transmission control is performed not only in consideration of the length of the distance based on position information but also in consideration of the interference level received from the other system. Therefore, since transmission by the transceiver can be restricted only in the case where it is truly necessary, it is preferable not only from the viewpoint of interference restriction but also resource use efficiency and the like.

[Embodiment 3]
(Operation Example for Performing Power Restriction Using Existence Notification Signal)

In the FDD system, frequencies used for uplink and downlink are different, so that pair bands are used for performing transmission and reception. Therefore, in the case when considering the interference from other systems, it is necessary to recognize uplink and downlink frequencies. In the time division duplex (TDD) system, although frequencies are the same between transmission and reception, the transceiver that is performing reception is not necessarily always performing transmission. Also, interval for performing transmission by a transceiver that mainly performs reception depends on using radio interfaces and transmitted traffic. For example, there is a possibility that a transceiver that is receiving multicast does not perform transmission for a long time. Therefore, it is necessary to properly ascertain these conditions for determining whether interference occurs actually.

Figure 11:
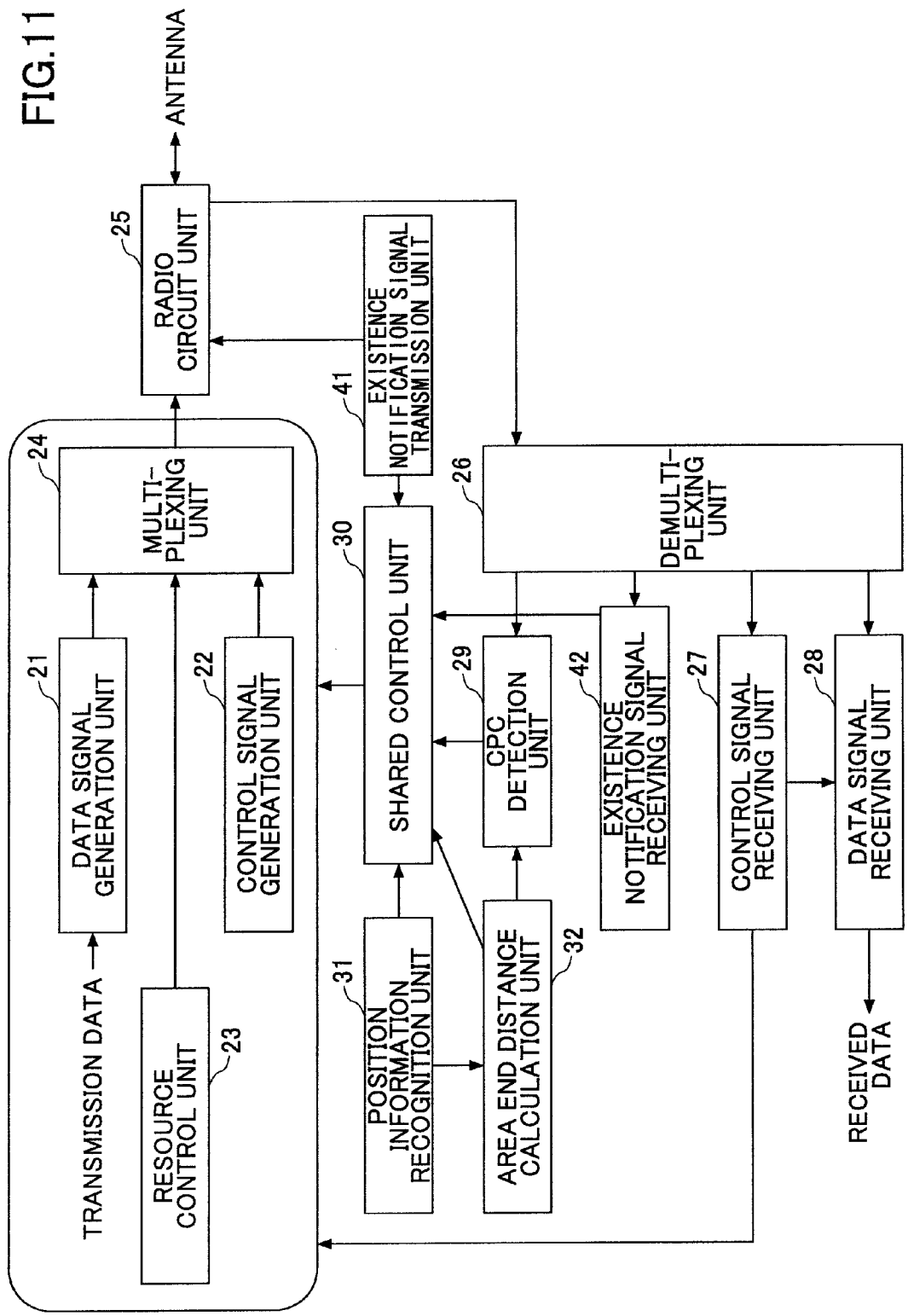
FIG. 11 is a diagram showing a transceiver in an embodiment of the present invention.

FIG. 11 shows a transceiver of an embodiment of the present invention. The same reference numbers are assigned to components already described in FIG. 6, and repeated explanation is not given. FIG. 11 further shows an existence notification signal transmission unit 41 and an existence notification signal receiving unit 42. In the present embodiment, each transceiver of the own and the other systems transmits an existence notification signal using the existence notification signal transmission unit 41 at a timing before transmitting a signal. The existence notification signal indicates that an apparatus transmitting the signal may exert inference on surrounding apparatuses. Also, the transceiver determines reception level of the existence notification signal using the existence notification signal receiving unit 42. According to the reception level of the received existence notification signal, the maximum transmission level is restricted. Accordingly, even in the case when the shortest distance to the system boundary is determined to be short in embodiment 1, communication is permitted depending on circumstances.

It should be identified whether the existence notification signal is a signal transmitted from a transceiver in the same area or the existence notification signal is a signal transmitted from a transceiver in other area. This is because, large interference occurs when the signal is transmitted from the other area (other system), so it is necessary to suppress the interference using an embodiment of the present invention.

In the present embodiment, control information for specifying a format of the existence notification signal may be reported in each area (in each system) using a common control channel such as a broadcast channel, or the control information may be broadcasted using a control signal transmitted by each transceiver. In the latter case, each transceiver may obtain the information using a wired network for example. As the format of the existence notification signal, (a set of) spreading codes used for each area may be specified, and radio resources (frequency, transmission timing, for example) by which the existence notification signal is transmitted may be specified. In addition, it is assumed that a predetermined power is used as the transmission power of the existence notification signal in principle. The reason is that, if the transmission power level of the existence notification signal is changed, there is fear that possibility of occurrence of interference cannot be properly determined based on the reception level.

Each transceiver detects the existence notification signal and performs transmission when the power of the signal becomes equal to or less than a predetermined value. Or, each transceiver may perform decision similar to that when performing control according to interference level received from the adjacent area, so as to perform permission/rejection of transmission of the transceiver or transmission power control.

[Embodiment 4]
(Operation Example for Using the Existence Notification Signal and Position in the Area)

When a plurality of transceivers exist near the boundary of the area in which frequency assignment is different, the maximum transmission power of a transceiver located closer to the area end should be controlled to be a lower value.

Figure 12:
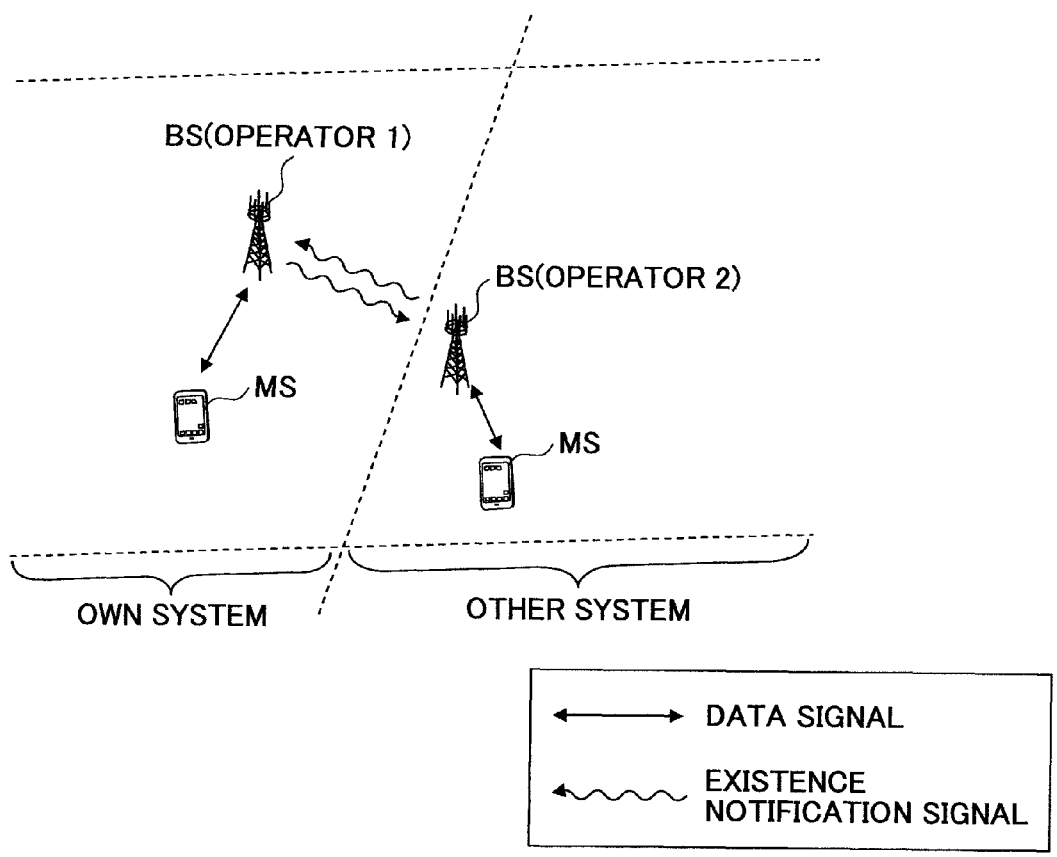
FIG. 12 is a diagram for explaining that amounts by which transmission power is restricted should be different.

In the example shown in FIG. 12, both of the base station of the operator 1 and the base station of the operator 2 exist near a system boundary. Therefore, transmission power should be reduced for both base stations from the viewpoint of interference level of embodiment 2 and the quality of the existence notification signal of the embodiment 3. However, in the example shown in the figure, it is supposed that the base station of the operator 1 may transmit a signal with transmission power larger than that for the base station of the operator 2. The base station of the operator 2 should transmit the signal with transmission power weaker than that for the base station of the operator 1.

In the present embodiment, transmission power control is performed in consideration of the distance of embodiment 1 in addition to the interference level of embodiment 2 and/or existence notification signal of embodiment 3. When the distance to an area where different frequency assignment is performed for the existence notification signal is equal to or less than a predetermined value and when the existence notification signal is received, transmission power is determined according to the distance to the system boundary. Accordingly, in the situation shown in the figure, it becomes possible that the base station of the operator 1 transmits a signal with transmission power larger than that of the base station of the operator 2. It is similar for user apparatuses.

In addition, although an example using the existence notification signal is shown in the present embodiment, control may be performed according to a signal level of interference received from the adjacent area in the method of the present embodiment.

[Embodiment 5]

(Operation Example when any Area is not Specified by CPC)

In each of the above-mentioned embodiments, a single transmission station transmits CPC including frequency assignment information for a plurality of areas (different frequencies). However, transmission of CPC may be permitted by each operator. In such a case, it is necessary that a format for transmitting CPC and contents to be transmitted are predetermined. These assignments may be performed beforehand or may be dynamically performed via a wired network and the like. For example, a transmission station (base station, typically) for transmitting CPC prepared by each operator transmits CPC including frequency assignment information assigned to each operator, and the like.

In this case, an application area for one CPC is specified, and each CPC may explicitly include information indicating which CPC is applied to which area. In addition, in an area where CPC is received, communication may be performed using a frequency and a signal format and the like specified by the CPC. In the case when an application area is specified as information, system information of CPC can be used according to the information.

However, in the case when the application area is not explicitly specified so that frequency assignment information transmitted by CPC should be used within a range where the CPC is received, it may become a problem in that a transceiver should follow which CPC. As to this point, following several methods can be considered.

(Method 1)

In an area where a plurality of CPCs are received by a transceiver, frequencies assigned by these CPCs cannot be used. This method may the easiest way, but is not preferable from the viewpoint of effectively utilizing resources.

(Method 2)

In an area where a plurality of CPCs are received by a transceiver, the transceiver selects one CPC, and performs transmission using a frequency band specified by the selected CPC. Restriction of transmission power of the frequency band is performed based on received signal levels of CPCs that are not selected. Any proper method can be adopted as the method for selecting one CPC. As an example, the CPC may be selected randomly. This method is preferable from the viewpoint of effectively utilizing resources.

(Method 3)

In an area where a plurality of CPCs are received by a transceiver, the transceiver selects one CPC, and performs transmission using a frequency band specified by the selected CPC. The transceiver receives and monitors interference signals and existence notification signals from systems assigned by non-selected CPCs, and the transceiver performs transmission when the signals are not received. Also, this method is preferable from the viewpoint of effectively utilizing resources.

[Embodiment 6]

(Operation Example in which Base Station Makes Decision and Reports to Mobile Station)

In the above-mentioned embodiments, embodiments in which each transceiver determines transmission power are mainly shown for the sake of convenience of explanation. However, as mentioned above, the method of embodiments of the present invention may be performed in the base station, in addition to the case where each transceiver is the mobile station. When the mobile station is configured to search a common control channel, a signal of band used in other system and the like, processing load of the mobile station becomes heavy. On the other hand, by configuring the base station to perform the processing, load of the mobile station can be reduced while benefiting from the present invention.

In the present embodiment, the base station performs the transmission permission/rejection or determination of transmission power that can be set, and the like. The determination result is reported to the mobile station using a control channel of each system. The mobile station holds a list of frequencies by which the mobile station can perform communication. The mobile station searches the frequencies in the list so as to determine whether the point where the mobile station is currently located is within a service area, and the mobile station starts communication when the mobile station can communicate with the base station of the same system.

Or, the mobile station searches a common control channel, and performs communication using a usable band detected first. The mobile station may search a predetermined band (which is not the common control channel) first, instead of the common control channel, then, the mobile station may search the common control channel only when an expected broadcast signal is not received.

The present invention is not limited to a particular system, and may be used in an area where a plurality of mobile communication systems coexist in any situations in which inter-system interference needs to be reduced. For example, the present invention may be applied to a W-CDMA system of the HSDPA/HSUPA scheme, a system of the LTE scheme, an IMT-Advanced system, WiMAX, a system of Wi-Fi scheme, and the like.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2008-096357, filed in the JPO on Apr. 2, 2008 and the entire contents of the Japanese patent application No. 2008-096357 are incorporated herein by reference.

The invention claimed is:

1. A radio communication apparatus for use in an area where a plurality of communication systems coexist, comprising:
   a receiving unit configured to receive a cognitive signal including system information of each of the systems;
   a metric unit configured to prepare metric information indicating relationship degree between the radio communication apparatus and a communication system to which the radio communication apparatus does not belong;

a condition determination unit configured to determine whether a restriction should be imposed on transmission by the radio communication apparatus based on the system information and the metric information; and a transmission unit configured to transmit a signal using predetermined radio resources when transmission by the radio communication apparatus is not prohibited, wherein the metric information is represented as a distance between a boundary and the radio communication apparatus, the boundary being between an area of a radio communication system to which the radio communication apparatus belongs and an area of a radio communication system to which the radio communication apparatus does not belong.

2. The radio communication apparatus as claimed in claim 1, wherein, when the distance is less than a predetermined threshold, transmission by the radio communication apparatus is prohibited.

3. The radio communication apparatus as claimed in claim 1, wherein, when the distance is less than a predetermined threshold, transmission using transmission power exceeding a predetermined value is prohibited.

4. A radio communication apparatus for use in an area where a plurality of communication systems coexist, comprising:

a receiving unit configured to receive a cognitive signal including system information of each of the systems;

a metric unit configured to prepare metric information indicating relationship degree between the radio communication apparatus and a communication system to which the radio communication apparatus does not belong;

a condition determination unit configured to determine whether a restriction should be imposed on transmission by the radio communication apparatus based on the system information and the metric information; and a transmission unit configured to transmit a signal using predetermined radio resources when transmission by the radio communication apparatus is not prohibited, wherein each communication apparatus belonging to each of the plurality of communication systems transmits an existence notification signal indicating presence or absence of the own communication apparatus, and wherein the metric information is represented as receive quality of the existence notification signal received from a radio communication system to which the radio communication apparatus does not belong.

5. A radio communication method in a radio communication apparatus for use in an area where a plurality of communication systems coexist, comprising the steps of:

receiving a cognitive signal including system information of each of the systems;

preparing metric information indicating relationship degree between the radio communication apparatus and a communication system to which the radio communication apparatus does not belong;

determining whether a restriction should be imposed on transmission by the radio communication apparatus based on the system information and the metric information; and transmitting a signal using predetermined radio resources when transmission by the radio communication apparatus is not prohibited, wherein the metric information is represented as a distance between a boundary and the radio communication apparatus, the boundary being between an area of a radio communication system to which the radio communication apparatus belongs and an area of a radio communication system to which the radio communication apparatus does not belong.

6. A radio communication method in a radio communication apparatus for use in an area where a plurality of communication systems coexist, comprising the steps of:

receiving a cognitive signal including system information of each of the systems;

preparing metric information indicating relationship degree between the radio communication apparatus and a communication system to which the radio communication apparatus does not belong;

determining whether a restriction should be imposed on transmission by the radio communication apparatus based on the system information and the metric information; and transmitting a signal using predetermined radio resources when transmission by the radio communication apparatus is not prohibited, wherein each communication apparatus belonging to each of the plurality of communication systems transmits an existence notification signal indicating presence or absence of the own communication apparatus, and wherein the metric information is represented as receive quality of the existence notification signal received from a radio communication system to which the radio communication apparatus does not belong.

* * * * *